United States Patent
Strohm et al.

(10) Patent No.: US 9,339,785 B2
(45) Date of Patent: May 17, 2016

(54) METHODS AND SYSTEMS FOR ACOUSTICALLY-ASSISTED HYDROPROCESSING AT LOW PRESSURE

(71) Applicant: BATTELLE MEMORIAL INSTITUTE, Richland, WA (US)

(72) Inventors: James J. Strohm, West Richland, WA (US); Benjamin Q. Roberts, Richland, WA (US); Kayte M. Denslow, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 196 days.

(21) Appl. No.: 14/132,262

(22) Filed: Dec. 18, 2013

(65) Prior Publication Data

US 2015/0165413 A1   Jun. 18, 2015

(51) Int. Cl.
| | |
|---|---|
| C10G 15/08 | (2006.01) |
| C10G 45/02 | (2006.01) |
| C10G 45/22 | (2006.01) |
| C10G 47/32 | (2006.01) |
| C10G 31/00 | (2006.01) |
| B01J 19/10 | (2006.01) |
| C10G 31/06 | (2006.01) |
| B01J 19/08 | (2006.01) |

(52) U.S. Cl.
CPC ............. *B01J 19/10* (2013.01); *C10G 15/08* (2013.01); *C10G 31/00* (2013.01); *C10G 45/02* (2013.01); *C10G 45/22* (2013.01); *C10G 47/32* (2013.01)

(58) Field of Classification Search
CPC .......... B01J 19/08; B01J 19/10; C10G 15/08; C10G 47/32; C10G 45/02; C10G 45/22; C10G 31/00; C10G 31/06
See application file for complete search history.

(56) References Cited

U.S. PATENT DOCUMENTS

| | | | |
|---|---|---|---|
| 5,299,175 A | 3/1994 | Gallego-Juarez et al. | |
| 6,227,193 B1 | 5/2001 | Selivanov | |
| 2003/0042174 A1* | 3/2003 | Austin | B01D 17/04 208/187 |
| 2004/0232051 A1* | 11/2004 | Varadaraj | C10G 9/007 208/265 |
| 2010/0051511 A1* | 3/2010 | Faerman | C10G 1/00 208/390 |
| 2010/0122933 A1 | 5/2010 | Khan | |
| 2011/0065969 A1* | 3/2011 | Chan | C10G 3/00 585/324 |

FOREIGN PATENT DOCUMENTS

| | | |
|---|---|---|
| WO | WO 2011/086522 | 7/2011 |
| WO | WO 2014/071223 | 5/2014 |
| WO | WO 2014/071223 | 7/2015 |

OTHER PUBLICATIONS

Gallego-Juarez, J.A., "Power ultrasonic transducers with extensive radiators for industrial processing," Ultrasonics Sonochemistry, Nov. 18, 2009, pp. 953-964, vol. 17, Elsevier, Madrid, Spain.

(Continued)

*Primary Examiner* — Brian McCaig
(74) *Attorney, Agent, or Firm* — Wells St. John P.S.

(57) ABSTRACT

Hydroprocessing can be performed at low pressure using acoustic energy. For example, hydroprocessing a feedstock having one or more hydrocarbon compounds carried in, or mixed with, a transport gas involves flowing the feedstock through a reaction zone in a reactor that has a bulk pressure less than 68 atm and applying acoustic energy through the reaction zone. The hydrocarbon compounds are chemically reacted with a hydrogen source in the presence of a catalyst, wherein the reacting occurs in the reaction zone.

13 Claims, 4 Drawing Sheets

(56) References Cited

OTHER PUBLICATIONS

Gallego-Juarez, J.A., "New Technologies in High-Power Ultrasonic Industrial Applications", Ultrasonics Symposium, 1994, pp. 1-10, IEEE Xplore, Madrid, Spain.

Mason, Timothy J., "Developments in ultrasound—Non-medical", Biophysics & Molecular Biology, ScienceDirect, Aug. 4, 2006, pp. 166-175, vol. 93, Elsevier, Coventry, UK.

Riera, Enrique, et al., "Airborne ultrasound for the precipitation of smokes and powders and the destruction of foams," Ultrasonics Sonochemistry, Aug. 15, 2005, pp. 107-116, vol. 13, Coventry, UK.

* cited by examiner ized to naphthenes; saturation of alkenes or alkynes to their respective paraffin (or naphthene); saturation of aldehydes, ketones, epoxides, or organic acids to alcohols; saturation of nitriles, anilines, or imines to amines; saturation of nitro groups to anilines, amines, or oximes; or related hydrogen saturation processes.

METHODS AND SYSTEMS FOR ACOUSTICALLY-ASSISTED HYDROPROCESSING AT LOW PRESSURE

STATEMENT REGARDING FEDERALLY SPONSORED RESEARCH OR DEVELOPMENT

This invention was made with United States Government support under contracts DE-AC0576RLO1830 and HR0011-10-C-0088 to Battelle Memorial Institute. The Government has certain rights in this invention.

BACKGROUND

Hydroprocessing is important to the production of a wide range of chemicals and fuels. Hydroprocessing units can have many forms and purposes within a refinery and are often the most common processing and upgrading units. For example, hydrotreating capacity within a refinery can comprise over 55% of the total refining capacity. Hydroprocessing can also be one of the most energy intensive and costly processes of fuel and chemical processing facilities. One of the reasons for the high energy usage and cost, is the high hydrogen pressure, often greater than 68 psi, required by traditional techniques.

Generally hydroprocessing is the catalytic conversion and removal of organic heteroatoms (sulfur, nitrogen, oxygen, and metals) and partial, or full, saturation of aromatic hydrocarbons from various refinery streams. As the quality of crude oils decrease and the production of fuels and chemicals from alternative feedstocks (i.e., biomass, coal, oil shales, tar sands, etc.) increases, the hydroprocessing demand within the refinery will have to increase to meet the increasingly stringent environmental regulations placed on fuel specifications and the growing world-wide demand for diesel fuels. Furthermore as more alternative oils and heavy and extra-heavy oils enter the market, not only would hydrotreating demands increase for removal of heteroatoms and aromatics, but hydrocracking capacity can be expected to grow to increase production of gasoline, jet, and diesel fuels from heavier hydrocarbon fractions, such as vacuum gas oils (VGO), petroleum resid (bp>550° C.), and bitumen. Accordingly, a need exists for low pressure hydroprocessing methods and systems.

SUMMARY

This document describes methods and systems for hydroprocessing at relatively low pressures. In one embodiment, a method for hydroprocessing a feedstock comprising one or more hydrocarbon compounds carried in, or mixed with, a transport gas is characterized by flowing the feedstock through a reaction zone in a reactor that has a bulk pressure less than 68 atm and applying acoustic energy into and/or through the reaction zone. The method further comprises chemically reacting the hydrocarbon compounds with a hydrogen source in the presence of a catalyst, wherein the reacting occurs in the reaction zone.

As used herein, hydroprocessing can refer to the general processes of hydrotreating, hydrogenation, and/or hydrocracking of hydrocarbon sources for the production of fuels and chemicals. Hydrotreating can refer to a collection of processes that include hydrodesulfurization (HDS), hydrodenitrogenation (HDN), hydrodeoxygenation (HDO), hydrodemetalization (HDM), or hydrodehalogenation for the removal of heteroatoms from hydrocarbon mixtures containing organic heteroatoms. Hydrotreating is a relatively mild hydroprocessing process that aims to selectively hydrogenate and remove the hetroatomic atom(s) from the organic heteroatoms, without significantly altering the boiling range of the final product.

Hydrogenation processes can refer to processes in which the raw hydrocarbons, typically containing aromatics, olefins, or organic heteroatoms are partially or fully saturated with hydrogen to alter the chemical composition and/or properties of the feedstock without complete removal of the heteroatom or ring-opening or molecular size reduction of aromatics or polyaromatics. Examples of hydrogenation processes can include, but are not limited to aromatic saturation to naphthenes; saturation of alkenes or alkynes to their respective paraffin (or naphthene); saturation of aldehydes, ketones, epoxides, or organic acids to alcohols; saturation of nitriles, anilines, or imines to amines; saturation of nitro groups to anilines, amines, or oximes; or related hydrogen saturation processes.

Hydrocracking can refer to processes in which hydrogenation and/or hydrotreating occur and are accompanied by cracking or cleavage of carbon-carbon bonds within the parent molecule. Examples include hydrocracking of long-chain paraffins to smaller paraffins; ring-opening of naphthenes, saturation of polyaromatics to naphthenes followed by ring-opening to generate alkylnaphthene and/or paraffins; dealkylization of aromatics and/or naphthenes; demethylization (or alkylation) of iso-parafins to n-paraffins, and other related hydrotreating or hydrogenation processes where the molecular size/weight of the parent molecule is reduced.

In some embodiments, the acoustic energy induces non-linear acoustic effects (e.g. acoustic streaming and radiation pressure) that, for example, can enhance mass transfer (e.g. mixing, infiltration, extraction, etc.). Non-linear acoustic energy can be generated using devices that provide acoustic frequencies and sound pressure levels that are together sufficient to induce these effects. In but one example, at 20 kHz, sound pressure levels greater than 100 dB can produce non-linear acoustic effects in predominantly gas-based hydroprocessing streams. Calculations of the acoustic Reynolds numbers for 20 kHz at sound pressure levels of 150-170 dB in the gases tested yielded values of ~1 to 200. Reynolds numbers greater than 1 can induce acoustic streaming to enhance mass transfer in gas phase systems. Acoustic streaming is one example of a non-linear acoustic effect and is believed to be a primary acoustic mechanism responsible for enhancing mass and heat transfer. Acoustic streaming, as used herein, can refer to a steady flow field superimposed upon the oscillatory motion of a sound wave propagating in a fluid. It can occur due to the presence of boundaries or because of damping of the wave (attenuation). These steady flows have rotational character and their velocity increases with sound intensity.

The hydrocarbon compound can comprise solid particulates, liquid fluid and/or vapor. In preferred embodiments, the hydrocarbon compound is often, though not always, a liquid at room temperature and pressure; it can be in either the vapor or liquid phase under the reacting conditions. Examples of hydrocarbon compounds can include, but are not limited to, derivatives or distillate cuts of oils, tars, and/or asphaltenes. Examples of oil, tars, and/or asphaltenes can include, but are not limited to, petroleum, coal-derived oils, biomass-derived oils, oil sands, oil shale, and bitumen sources.

In some embodiments, the reaction zone can have a bulk pressure less than 34 atm. In others, the bulk pressure can be less than 17. In yet others, the bulk pressure can be less than 7 atm. In still others, the bulk pressure can be less than 3 atm. In preferred embodiments, the bulk pressure is approximately equivalent to atmospheric pressure. The liquid hourly space velocity (LHSV) can be greater than 0.1 hr$^{-1}$.

As described elsewhere herein, the LHSV is defined as the volumetric feed rate (e.g. units of L/hr) divided by the volume of the reaction zone (e.g. units of L) containing the catalyst. While the weight hourly space velocity (WHSV) is defined as the mass feed rate of the hydrocarbon feedstock (e.g. units of kg/hr) divided by the active catalyst weight (e.g. units of kg). In some embodiments the catalyst is diluted with inert packing material (e.g. SiC) to aid in the dissipation of heat, in these cases the LHSV is the total volume of the reaction zone that includes both the active catalyst and inert packing material. An approximate equivalent weight hourly space velocity (WHSV) to an LHSV of 0.1 $hr^{-1}$ is 0.12 $hr^{-1}$ for a liquid feed density of 0.88 g/ml and active catalyst packing density of 0.75 g/ml.

Preferably, the average bulk temperature of the reaction zone ranges from 120° C. to 450° C. While other temperatures can be suitable, hydroprocessing reactions can benefit from relatively lower temperatures due to thermodynamic considerations. For example, above 450° C., cracking reactions can be predominant. Cracking reactions might be desirable in certain instances, but often times it is not preferable.

In one embodiment, a method of hydroprocessing a feedstock comprising one or more hydrocarbon compounds carried in, or mixed with, a transport gas is characterized by flowing the feedstock through a reaction zone in a reactor, wherein the reaction zone has a bulk pressure less than 3 atm. The method further comprises applying acoustic energy through the reaction zone, wherein the acoustic energy has frequencies and sound pressure levels sufficient to induce non-linear effects, and chemically reacting the hydrocarbon compounds with a hydrogen source in the presence of a catalyst in the reaction zone.

A variety of hydrogen-containing compounds are suitable for use as a hydrogen source. Examples can include, but are not limited to hydrogen, methane, natural gas, light hydrocarbons ($\leq C4$), and combinations thereof.

A system for hydroprocessing a feedstock comprising one or more hydrocarbon compounds carried in, or mixed with, a transport gas is characterized by an inlet through which feedstock flows to a reactor and a reaction zone in the reactor. The reaction zone comprises a volume in which the hydrocarbon compounds react with a hydrogen source in the presence of a catalyst at a bulk pressure less than 68 atm during operation. The system further comprises a transducer coupled to the reactor and configured to impart acoustic energy through the reaction zone.

In some embodiments the reactor can be configured as a trickle bed reactor, a fixed catalytic bed reactor, a fluidized catalytic bed reactor (including ebulating bed reactors), or a moving catalytic bed reactor. The hydrocarbon compounds can be selected from the group consisting of solid particulates, liquid fluid, vapor, and combinations thereof. Preferably, the bulk phase of the feedstock is vapor. In preferred embodiments, the bulk pressure in the reaction zone is less than, or equal to, 34 atm.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
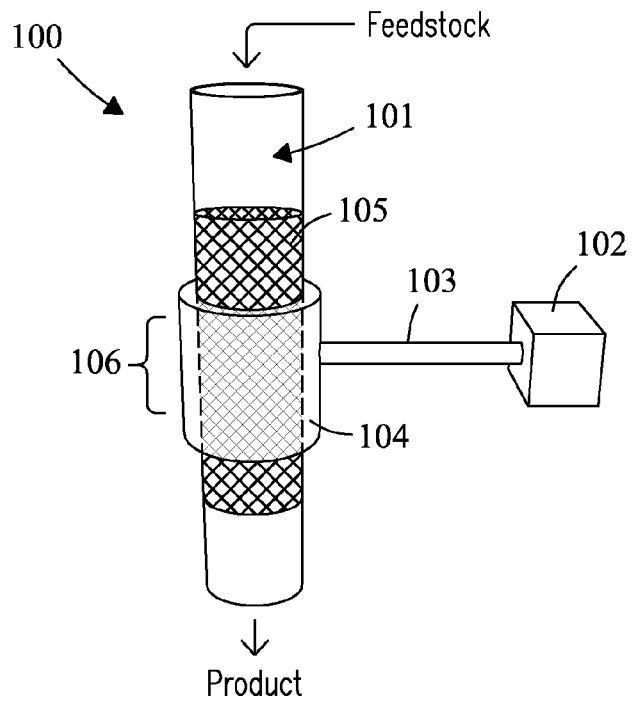
FIG. 1 is a schematic depicting a tubular system for hydroprocessing a feedstock using acoustic energy according to embodiments of the present invention.

FIGS. 1-4 show a variety of aspects and embodiments of the present invention. Referring first to FIG. 1, the diagram depicts one embodiment of a system 100 for hydroprocessing a feedstock. Acoustic energy is directed from a transducer 102 to a reaction zone 106 via a waveguide 103. The transducer and waveguide can be coupled to a reactor 101 at the reaction zone by a coupling device 104. One example includes, but is not limited to, a clamp. The reactor in this embodiment is tubular and the reaction zone comprises a volume containing a catalyst 105.

The reactor is configured for vapor phase or mixed vapor and liquid phase operation. In some embodiments, the reactants can comprise a minor fraction of solid particulates and/or liquid fluid carried in, or mixed with, a transport or reactive gas. The system is configured such that during operation, hydrocarbons and a hydrogen source enter the reactor tube and pass through the reaction zone, which has a bulk pressure less than 68 atm and into which acoustic energy is imparted. Product collection and/or analysis can occur down stream of the reaction zone. In some embodiments, the reactor can be configured as a fluidized catalytic bed reactor or a moving catalytic bed reactor. This is, at least in part, enabled by the lower pressure operation relative to traditional hydroprocessing systems.

Figure 2:
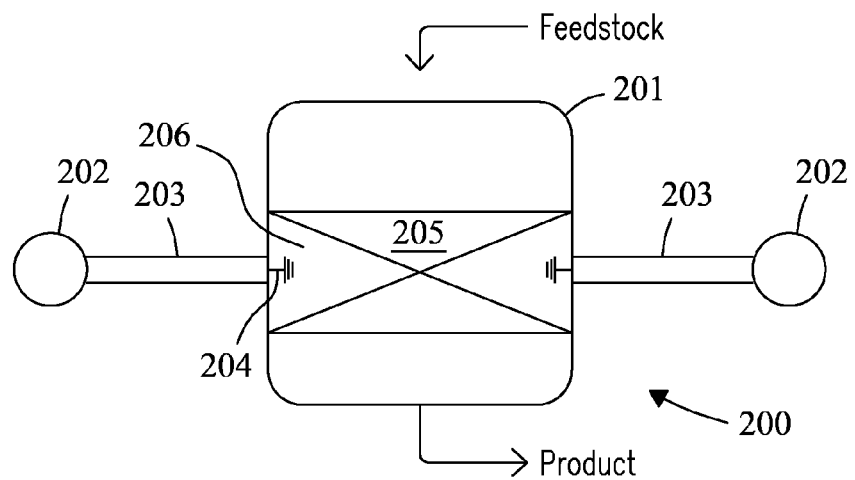
FIG. 2 is a schematic depicting a system for hydroprocessing a feedstock using acoustic energy according to embodiments of the present invention.

FIG. 2 contains a diagram depicting another embodiment of a system 200. Radiating plates 204 provide acoustic energy from a transducer 202 and through a waveguide 203 to the reaction zone 206 of a reactor vessel 201. The reaction zone comprises a catalyst load 205. The waveguides and/or radiating plates can be arranged in a variety of orientations relative to the reactor vessel and/or reaction zone. Depending on the type of reactor (i.e., moving bed, fixed, bed, fluidized bed, etc.), the reactants can enter and products can exit at various positions of the reactor vessel (e.g., top, bottom, side, etc.).

Figure 3:
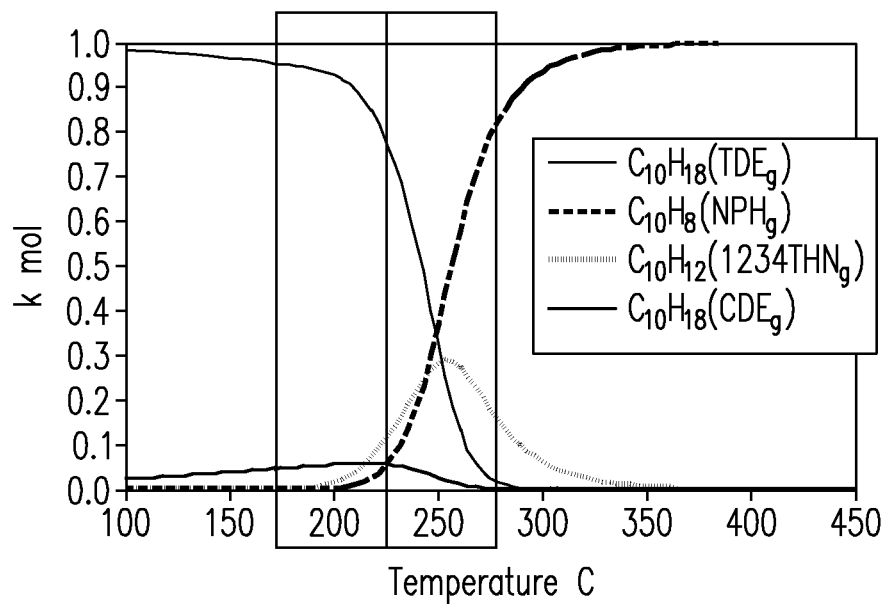
FIG. 3 is a graph depicting equilibrium amounts of various compounds as a function of temperature corresponding to operating conditions of Example 1

Referring to FIG. 3, a plot summarizes equilibrium amounts of trans-decalin, cis-decalin, tetralin, and naphthalene as a function of temperature for a fixed pressure of 1 atm with an 86% $H_2$ feed, which corresponds to the conditions used in Example 1 below. Formation of toluene and methyl cyclohexane were suppressed to calculate only equilibrium naphthalene hydrogenation products of cis-decalin, trans-decalin, and tetralin.

EXAMPLE 1

Figure 4:
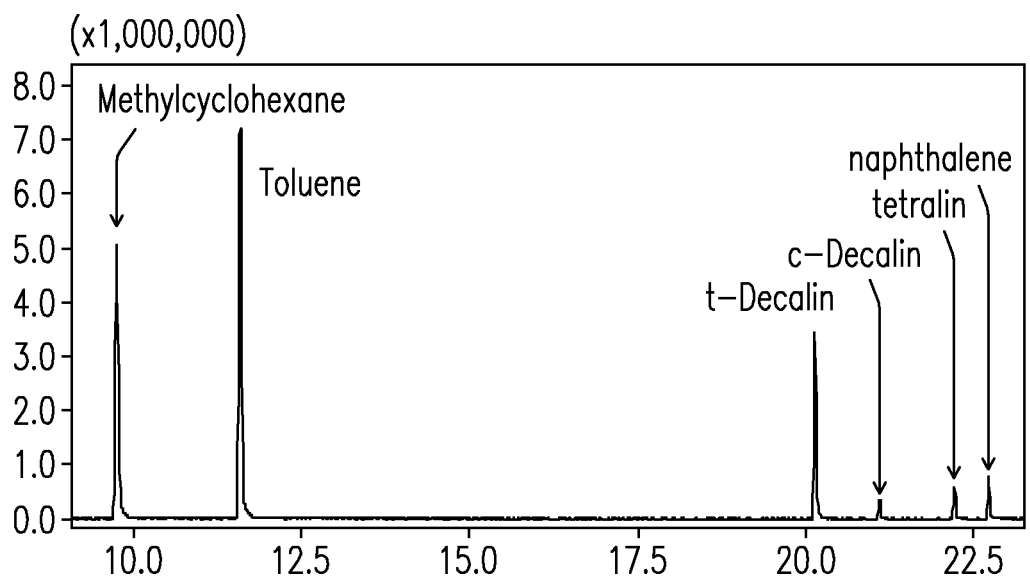
FIG. 4 is a gas chromatogram of a product sample obtained from a feed comprising aromatics after processing according to embodiments of the present invention.

Referring to FIG. 4, a gas chromatogram identifies the primary components of a product stream after hydrogenation of a feed comprising aromatics that include toluene and napthalene in a 3:1 wt:wt ratio of toluene to naphthalene using acoustic energy according to embodiments of the present invention. The product stream includes unreacted feed (toluene and naphthalene), methylcyclohexane as well as tetralin and decalin (a mixture of both cis and trans isomers), both of which result from the presence of the acoustic energy and are not expected without the acoustic energy. While FIG. 3 indicates the possibility of the presence of decalin based on equilibrium conditions, in practice they are almost always absent because of mass transport and kinetic limitations. It is significant that the chromatogram is "clean" and does not indicate the presence of other reaction products, within the detection limits of the GC.

TABLE 1

Sumary of reaction conditions and compositions
for a feed stream and four resulting samples

|  | Feed | Sample 1 | Sample 2 | Sample 3 |
|---|---|---|---|---|
| Conditions | | | | |
| Temperature, ° C. | | 170-215 | 215-265 | 265-240 |
| WHSV (hr$^{-1}$) | | 5.28 | 5.28 | 5.28 |
| $H_2$, mol % of feed | | 86 | 86 | 86 |
| Acoustic Power, W | | 300 W | 300 W | 0 |
| Sampling time, min | | 30 | 30 | 30 |
| temperature rise during sampling time, ° C. | | 45 | 50 | −25 |

TABLE 1-continued

Sumary of reaction conditions and compositions
for a feed stream and four resulting samples

|  | Feed | Sample 1 | Sample 2 | Sample 3 |
|---|---|---|---|---|
| average Temperature, ° C. | | 198 | 232 | 242 |
| Composition | | | | |
| methyl-cyclohexane, wt % | 0 | 39.5 | 9.2 | n.d. |
| Other alkyl naphthalene (C7), wt % | | 0.13 | .15 | n.d. |
| Toluene, wt % | 74.8 | 42.78 | 66.9 | 77.2 |
| t-decalin, wt % | | 11.92 | 6.9 | n.d. |
| c-decalin, wt % | 0 | 1.2 | 1.2 | n.d. |
| tetralin, wt % | 0 | 1.93 | 7.5 | 7.6 |
| naphthalene, wt % | 25.2 | 2.97 | 4.3 | 9.01 |
| TOTAL, wt % | 100 | 100.43 | 96.26 | 93.82 |
| Toluene conversion, % | | 43.1 | 7.0 | −7.5 |
| naphthalene conversion, % | | 88.2 | 82.9 | 57 |
| Equilibrium naphthalene conversion, % | | 98.4 | 96.4 | 90.7 |
| Selectivity of toluene to methylcyclohexane | | 97.2 | 99 | −3 |
| selectivity of naphthalene to decalin (c + t) | | 95.8 | 51 | 0 |
| selectivity of naphthalene to tetralin | | 4.8 | 49 | 90 | n.d.—not detected/below detection limit

Figure 5:
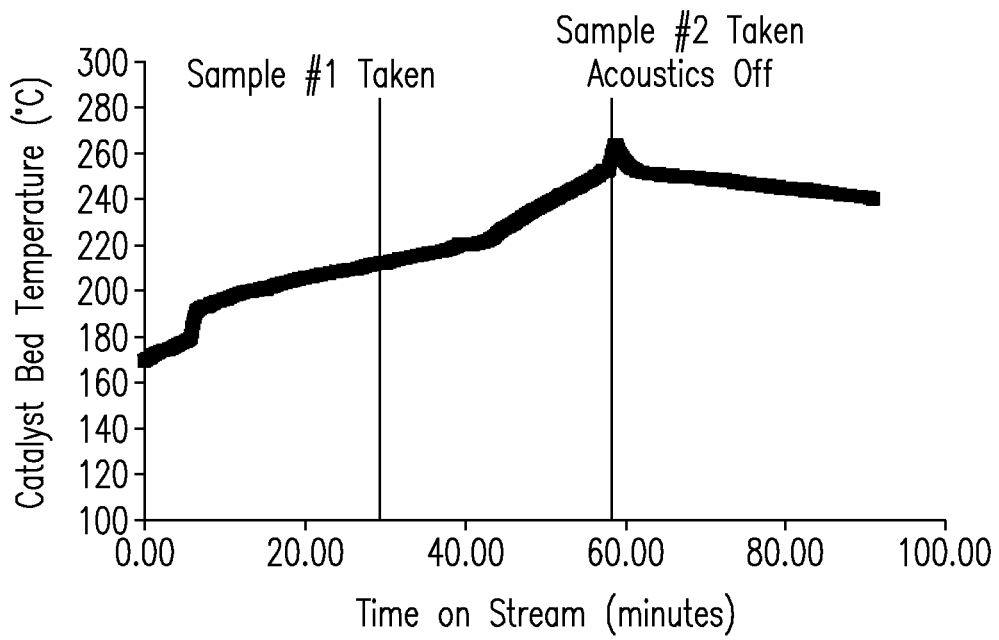
FIG. 5 is a plot of the catalytic bed temperature (center of catalytic bed) as a function of time on stream corresponding to example 1

Elaborating on the data shown in FIG. 4, acoustic energy was utilized according to embodiments of the present invention for the vapor phase, low pressure hydrogenation of aromatics to cyclic paraffins. A 3:1 mixture of toluene:naphthalene was co-fed with hydrogen into the acoustic reaction zone. Various trials were performed with and without acoustic energy at approximately atmospheric pressure. Table 1 provides a summary of the reaction conditions and compositions for the feed stream at three different time intervals (labeled as Sample 1-3) wherein the experiment conditions between samples 1 and 2 were identical, with the exception of the catalytic bed temperature increasing due to the exothermic nature of the hydrogenation reactions. For sample 3, acoustic energy was not applied. The temperature during each interval differed because the hydrogenation reaction is very exothermic, causing an increase in temperature as the reaction progressed. FIG. 5 shows the temperature profile of the catalytic bed as a function of the time on stream with corresponding notation indicating when samples 1-3 were collected and the time when acoustic energy was turned on and off.

The equilibrium amounts of trans-decalin, cis-decalin, tetralin, toluene, methyl cyclohexane, and naphthalene at variable temperatures and a fixed pressure of 1 atm with an 86% $H_2$ feed are provided. Without imparting acoustic energy into the reaction zone (see Sample 3), approximately 57% of the naphthalene was converted and only tetralin was formed. Effectively no toluene was converted and no methyl cyclohexane was formed. The −7% toluene conversion is believed to be due to the formation of toluene from naphthalene conversion. When acoustic energy was imparted and with temperatures between 170° C. and 215° C. (see Sample 1), approximately 88% of the naphthalene was converted and approximately 43% of the toluene was converted to methylcyclohexane. The converted naphthalene comprised 79% trans decalin, 8% cis decalin, and 13% tetralin. At temperatures between 215° C. and 265° C. with acoustic energy (see Sample 2), approximately 83% of the naphthalene was converted and approximately 8% of the toluene was converted to methylcyclohexane. The converted naphthalene comprises 44% trans decalin, 7% cis decalin, and 49% tetralin.

EXAMPLES 2

Figure 6:
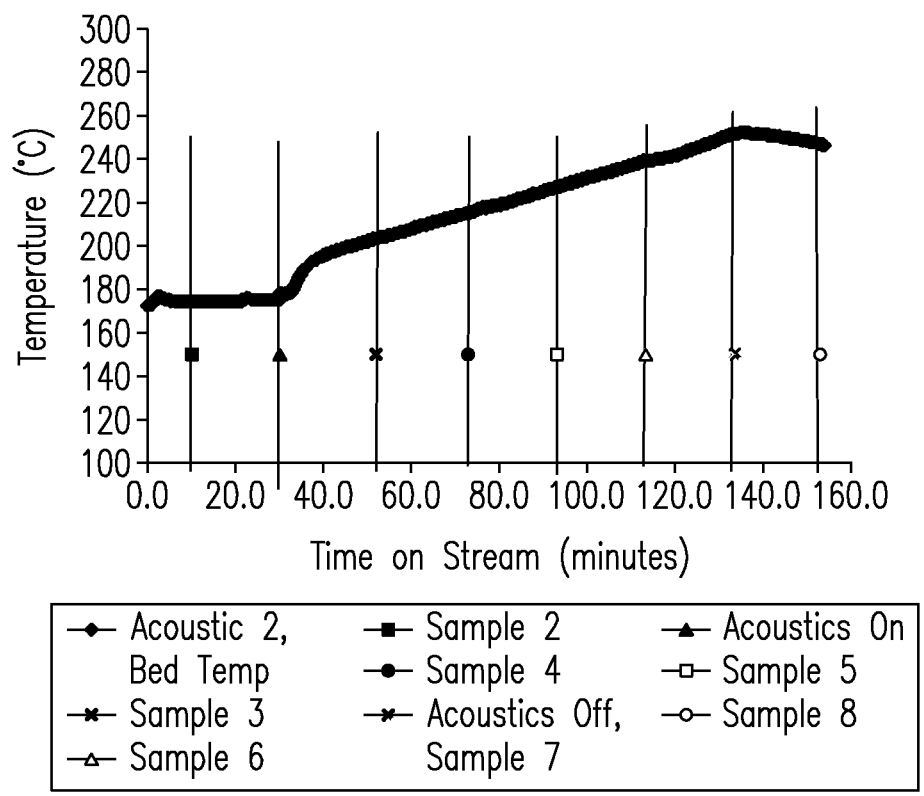
FIG. 6 is a plot of the catalyst bed temperature as a function of time on stream corresponding to example 2 where not acoustic energy was applied for the first 30 minutes on steam or after 135 minutes on stream

In another example, the same reaction mixture comprising a 3:1 blend of toluene and naphthalene was co-fed into the acoustic reaction zone, which contained a commercially available hydrogenation catalyst. FIG. 6 shows the temperature profile of the catalyst bed throughout the course of experimentation. For the first 30 minutes on stream, no acoustic energy was applied and the temperature profile of the catalyst bed remains relatively constant at a temperature of 175° C. At a time on stream from 30 minutes through 130 minutes, acoustic energy was applied to the catalyst bed. Immediately upon turning on the acoustic energy, the bed temperature rapidly increased by ~20° C. to a temperature of ~195° C. Throughout the 100 minutes when acoustic energy is applied, the catalyst bed temperature steadily increased to a temperature of 252° C. Once the acoustic energy was turned off at a time on stream of 130 minutes the temperature of the catalyst bed steadily decreased. Based on the exothermic nature of the hydrogenation reactions occurring, the increasing temperature of the catalyst bed when acoustic energy is applied to the catalyst bed is a clear indication of hydrogenation activity at atmospheric pressure. Hydrogenation activity is believed to be absent when acoustic energy is not applied since the temperature of the catalyst bed remains constant or is reduced.

EXAMPLES 3

Figure 7:
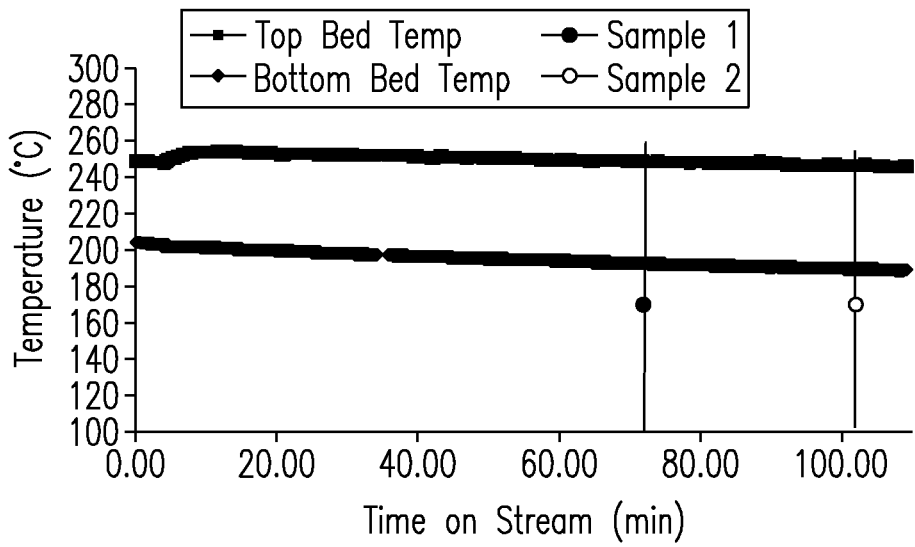
FIG. 7 is a plot of the catalyst bed temperature as a function of time on stream for example 3, where acoustic energy was applied throughout the entire duration of testing.

A complex feed mixture can be fed through the system with a composition shown in Table 2. In the instant example, the experimental conditions were kept as constant as possible with the exception of the applied acoustic energy. No acoustic energy was applied and the results are representative of the degree of hydrogenation and desulfurization achievable under the such a system. FIG. 7 shows the temperature profile for as measured at the top and the bottom of the bed. When the feed is initially introduced, there is a slight increase in temperature by ~3° C. at the top of the bed due to feed preheating at 300° C. However, the temperature at both the top and bottom of the bed remains relatively constant throughout the entire experiment. The lack of temperature rise indicates little to no hydrogenation or desulfurization of the feedstock, which is confirmed by product analysis shown in Table 3. Table 3 shows that the incoming feed and outcoming product without acoustic energy applied has the same (within error) sulfur concentration and H/C ratio of the oil.

EXAMPLE 4

Figure 8:
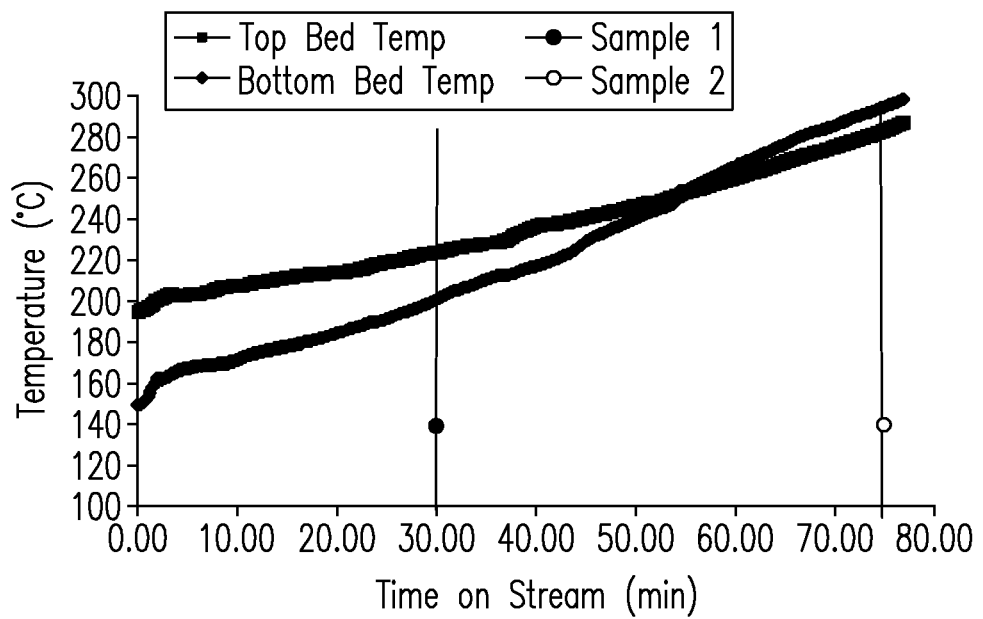
FIG. 8 is a plot of the catalyst bed temperature as a function of time on stream for example 4, where the conditions are the same as example 3 but not acoustic energy was applied throughout the duration of the experiment.

Under similar conditions to Example 3, Example 4 applies acoustic energy to the catalytic bed. FIG. 8 shows the temperature rise of the top and bottom of the catalyst bed. When acoustic energy is applied, there is a rapid increase in the temperature as measured at the top and bottom of the bed, indicating significant hydrogenation activity. Hydrogenation activity for when acoustic energy is applied to the system is confirmed by both the increase in temperature (even when the heater power for the catalyst zone is turned off) and by product analysis shown in Table 3. Table 3 shows reduction in sulfur content of the product oil collected after 30 minutes and 76 minutes on stream by ~100% and 96%, respectively, when acoustic energy is applied. Correspondingly the H/C ratio of the oil product is improved from 1.24 to 1.44 and 1.34 after 30 minutes and 76 minutes on stream.

TABLE 2

Feed Mixture for Examples 3 and 4 Containing 275 ppm S

| Compound | Wt % in feed |
|---|---|
| Napthalene | 7.12 |
| Phenanthrene | 1.57 |
| Anthracene | 0.95 |
| Acenaphthalene | 3.15 |
| 1-methyl naphthalene | 23.65 |
| toluene | 30.68 |
| Decane | 22.35 |
| Benzene | 10.40 |
| methylbenzothiophene | 0.13 |

TABLE 3

Summary of Examples 3 and 4

|  | FEED | Example 3 (TOS 0 to 72 mins) | Example 4 (TOS 0 to 30 mins) | Example 4 (TOS 30 to 76 mins) |
|---|---|---|---|---|
| CONDITIONS |  |  |  |  |
| WHSV, hr−1 |  | 5.1 | 5.2 | 5.2 |
| H2/oil (scf/bbl) |  | 11230 | 11230 | 11230 |
| Acoustic Power, W |  | 0 | 650 | 650 |
| Feed Preheat Temp, ° C. |  | 300 | 300 | 300 |
| Wall Temperature Set, ° C. |  | 300 | 260 | 35 |
| COMPOSITIONS |  |  |  |  |
| H/C Ratio | 1.24 | 1.25 | 1.44 | 1.34 |
| Sulfur Conc., ppmw | 275 | 273 | BDL | 12 |
| mass balance |  | 99.56 | 94.94 | 99.54 |

BDL = below detection limit

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method of hydroprocessing a feedstock comprising one or more hydrocarbon compounds carried in, or mixed with, a transport gas, the method comprising:
   flowing the feedstock through a reaction zone in a reactor, the reaction zone having a bulk pressure less than 3 atm;
   applying acoustic energy through the reaction zone; and
   chemically reacting the hydrocarbon compounds with a hydrogen source in the presence of a catalyst, said reacting occurring in the reaction zone.

2. The method of claim 1, wherein the hydrocarbon compounds comprise solid particulates.

3. The method of claim 1, wherein the hydrocarbon compounds comprise liquid fluid.

4. The method of claim 1, wherein the hydrocarbon compounds comprise vapor.

5. The method of claim 1, wherein said applying acoustic energy further comprises inducing non-linear acoustic effects.

6. The method of claim 1, wherein the reaction zone has a bulk pressure approximately equivalent to atmospheric pressure.

7. The method of claim 1, wherein the hydrocarbon compounds comprise derivatives or distillate cuts of oils, tars, or asphaltenes.

8. The method of claim 7, wherein the oil, tars, or asphaltenes comprise petroleum, coal-derived oils, biomass-derived oils, oil sands, oils shale.

9. The method of claim 1, wherein the hydrogen source is selected from the group consisting of hydrogen, methane, natural gas, light hydrocarbons (≤C4), and combinations thereof.

10. The method of claim 1, having a liquid hourly space velocity (LHSV) greater than 0.1 hr−1.

11. The method of claim 1, wherein the reaction zone has a bulk temperature from 120° C. to 450° C.

12. The method of claim 1, wherein said reacting comprises a reaction selected from the group consisting of hydrogenation, hydrocracking, hydrodesulfurization, hydrodenitrogenation, hydrodeoxygenation, hydrodemetalization, and combinations thereof.

13. A method of hydroprocessing a feedstock comprising one or more hydrocarbon compounds carried in or mixed with a transport gas, the method comprising:
    flowing the feedstock through a reaction zone in a reactor, the reaction zone having a bulk pressure less than 3 atm;
    applying acoustic energy through the reaction zone, the acoustic energy having frequencies and sound pressure levels sufficient to induce non-linear effects; and
    chemically reacting the hydrocarbon compounds with a hydrogen source in the presence of a catalyst, said reacting occurring in the reaction zone.

\* \* \* \* \*